(12) United States Patent
Ding et al.

(10) Patent No.: US 10,915,794 B2
(45) Date of Patent: Feb. 9, 2021

(54) NEURAL NETWORK CLASSIFICATION THROUGH DECOMPOSITION

(71) Applicant: Intel Corporation, Santa Clara, CA (US)

(72) Inventors: Ke Ding, Shanghai (CN); Chun Luo, Shanghai (CN)

(73) Assignee: Intel Corporation, Santa Clara, CA (US)

(*) Notice: Subject to any disclaimer, the term of this patent is extended or adjusted under 35 U.S.C. 154(b) by 797 days.

(21) Appl. No.: 15/548,396

(22) PCT Filed: Mar. 26, 2015

(86) PCT No.: PCT/CN2015/075125
§ 371 (c)(1),
(2) Date: Aug. 2, 2017

(87) PCT Pub. No.: WO2016/149937
PCT Pub. Date: Sep. 29, 2016

(65) Prior Publication Data
US 2018/0039863 A1  Feb. 8, 2018

(51) Int. Cl.
*G06K 9/62* (2006.01)
*G06N 3/08* (2006.01)
(Continued)

(52) U.S. Cl.
CPC ......... *G06K 9/6267* (2013.01); *G06K 9/6232* (2013.01); *G06N 3/0454* (2013.01); *G06N 3/063* (2013.01); *G06N 3/082* (2013.01)

(58) Field of Classification Search
CPC .. G06K 9/6267; G06K 9/6232; G06N 3/0454; G06N 3/063; G06N 3/082
See application file for complete search history.

(56) References Cited

U.S. PATENT DOCUMENTS

| 7,016,885 B1 | 3/2006 | Mikhael et al. |
| 2003/0135475 A1 | 7/2003 | Tannhof et al. |
| 2015/0340032 A1* | 11/2015 | Gruenstein ............. G10L 15/16 |

FOREIGN PATENT DOCUMENTS

| CN | 103000172 A | 3/2013 |
| CN | 104035563 A | 9/2014 |

OTHER PUBLICATIONS

Extended European Search Report dated Oct. 22, 2018 for European Patent Application No. 15885876.1, 12 pages.
(Continued)

*Primary Examiner* — Alan Chen
(74) *Attorney, Agent, or Firm* — Schwabe, Williamson & Wyatt, P.C.

(57) ABSTRACT

A classification system is described which may include neural network decomposition logic ("NND"), which may perform classification using a neural network ("NN"). The NND may decompose a classification decision into multiple sub-decision spaces. The NND may perform classification using an NN that has fewer neurons than the NND utilizes for classification and/or which accepts feature vectors of a smaller size than are input into the NND. The NND may maintain multiple contexts for sub-decision spaces, and may switch between these in order to perform classification using the sub-decision spaces. The NND may combine results from the sub-decision spaces to decide a classification. By diving the decision into sub-decision spaces, the NND may provide for classification decisions using NNs that might otherwise be unsuitable for a particular classification decisions. Other embodiments may be described and/or claimed.

21 Claims, 9 Drawing Sheets

(51) Int. Cl.
G06N 3/04 (2006.01)
G06N 3/063 (2006.01)

(56) References Cited

OTHER PUBLICATIONS

Cao J. et al., "A hierarchical neural network architecture for handwritten numeral recognition", Pattern Recognitiion, Elsevier, GB, 1997, pp. 289-294, vol. 30, No. 2.

Xiao Chun et al., "An application of data fusion technology in structural health monitoring and damage identification", Proceedings of SPIE, May 16, 2005, 12 pages, vol. 5758.

Tsai T. H. et al., "Neural network based temporal feature models for short-term railway passenger demand forecasting", Expert Systems With Applications, Oxford, GB., 2009, pp. 3728-3736, vol. 36, No. 2.

Zhicheng Yan et al., "HD-CNN: Hierarchical Deep Convolutional Neural Network for Image Classification", Oct. 3, 2014, 8 pages, Global IP News: Information Technology Patent News.

International Search Report and Written Opinion dated Dec. 21, 2015 for International Application No. PCT/CN2015/075125, 11 pages.

\* cited by examiner

NEURAL NETWORK CLASSIFICATION THROUGH DECOMPOSITION

CROSS REFERENCE TO RELATED APPLICATIONS

The present application is a national phase entry under 35 U.S.C. § 371 of International Application No. PCT/CN2015/075125, filed May 26, 2015, entitled "NEURAL NETWORK CLASSIFICATION THROUGH DECOMPOSITION", which designated, among the various States, the United States of America. The Specifications of the PCT/CN2015/075125 Application is hereby incorporated by reference.

TECHNICAL FIELD

The present disclosure relates to the field of data processing, in particular, to apparatuses, methods and storage media associated with performing neural network classification through decomposition.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Frequently, computing systems are called upon to classify input data into classifications. In some circumstances, higher-level information may be determined based on a fusion of various inputs. In some scenarios, data from sensors associated with a person may be merged or fused to determine a context associated with the user. For example, data from motion sensors may be fused to classify a physical activity by a user, such as walking, running, biking, driving, etc. In another example, motion sensors data may be fused to classify motion gestures, such as recognition of flicks, taps, lifting and looking at a device, drawing of shapes, etc. In yet another example, data captured from a microphone may be fused to classify environmental audio, such as music, speech, crowd presence, motion sound, etc. While these scenarios provide some examples of complex sensor fusion classification tasks, in other scenarios, classification may be performed with other data or to determine other contexts.

In various scenarios, due to the complexity of performing such classifications, the use of neural networks may be desirous. Some computing platforms, such as wearable or mobile devices, provide neural network computational logic, which may, in some scenarios, be hardware-based. However, this neural network logic may be limited in certain scenarios. For example, the neural network provided by a computing platform may contain a limited number of neurons to utilize for neural network computation. In another example, the neural network may be limited to accepting inputs of particular sizes. This may prove problematic in some applications, such as when the size of available input data outsizes the input size accepted by the neural network logic, or when the classification problem requires a greater number of neurons than are present in the neural network logic. These limitations may be particularly difficult to deal with when the neural network logic is implemented in hardware and thus may not be easily extended.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Figure 1:
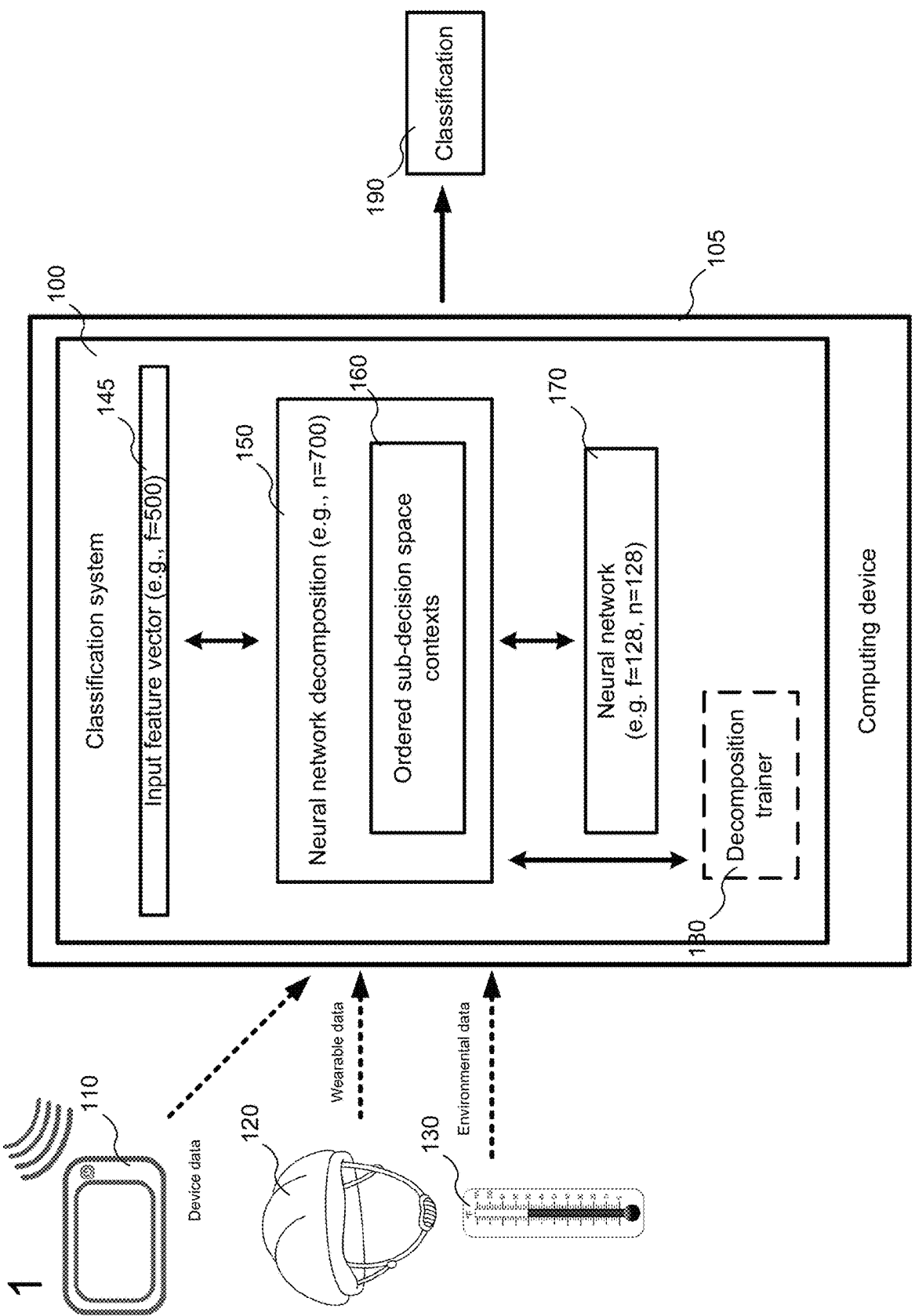
FIG. 1 illustrates an example arrangement for a classification system using decomposition techniques as described herein, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. As described herein, the term "logic" and "module" may refer to, be part of, or include a System on a Chip, as described below.

In various embodiments, a classification system may include neural network decomposition logic ("NND"), which may be configured to perform classification using a neural network ("NN"). The NND may be configured to decompose a classification decision into multiple sub-decision spaces. In such embodiments, the NND may be configured to perform classification using an NN that has fewer neurons than the NND utilizes for classification and/or which accepts feature vectors of a smaller size than are input into the NND. In various embodiments, the NND may maintain multiple contexts for sub-decision spaces, and may switch between these in order to perform classification using the sub-decision spaces. In various embodiments, the NND may combine results from the sub-decision spaces to decide a classification. In various embodiments, by diving the decision into sub-decision spaces, the NND may provide for classification decisions using NNs that might otherwise be unsuitable for a particular classification decisions.

Referring now to FIG. 1, an example arrangement for a classification system 100 ("CI 100") using decomposition techniques as described herein is illustrated in accordance with various embodiments. In various embodiments, the CI 100 may be configured to take an input feature vector 145 and to output a classification 190. In various embodiments, the CI 100 may be implemented on a variety of computing devices 105. For example, the computing device 105 may include one or more of: mobile devices, wearable devices, laptop devices, desktop devices, etc. Additionally, while FIG. 1 illustrates computing device 105 as including a single device, for the purposes of clearer illustration, in various embodiments, aspects of computing devices 105 may be divided across multiple devices, implemented across a network, and/or in a cloud-based distribution. Embodiments of the computing device 105 may be further described below with respect to FIGS. 8 and 9. In various embodiments, the CI 100 may be configured to perform various classification decisions, such as fusion of sensor data to determine contexts for device use, as described above. Thus, FIG. 1 illustrates multiple examples of input data, such as, but not limited to, device data 110, wearable data 120, and environmental data 130. In various embodiments, one or more of this data may be accepted as input to the CI 100 for performance of classification decisions. It may be recognized, however, that while particular examples of data are illustrated in FIG. 1, in various embodiments different combinations, or different categories of data entirely, may be used as input to the CI 100.

In various embodiments, the computing device 100 may include a neural network 170 ("NN 170"). In some embodiments, the NN 170 may be implemented in hardware (such as illustrated in FIG. 1). For example, in various embodiments, the NN 170 may be implemented as an implementation of associative memory. In other embodiments, the NN 170 may be implemented in whole, or in part, in software.

In various embodiments, the NN 170 may consist of an array of neurons, where each neuron stores an n-dimensional reference feature vector. In such embodiments, each neuron may represent a part of a decision space for a given classification. Classification decisions may, in turn, be determined through calculation of a result vector and determination of that result vector's distance to neurons. In various embodiments, the NN 170 may include a set number of neurons, such as 128 neurons, and may take as input a feature vector of a set length, such as 128 bytes (as illustrated in the example NN 170 in FIG. 1).

In various embodiments, the CI 100 may include neural network decomposition logic 150 ("NND 150"), which may be configured to perform classification decisions using the NN 170. In various embodiments, the NND 150 may be configured to decompose a classification decision into sub-decision spaces which may be performed on the NN 170. Through such decomposition, the NND 150 may provide the ability to perform classification using more neurons than are implemented in the NN 170 and/or using input feature vectors 145 which are longer that the feature vectors which the NN 170 is configured to accept. Thus, in the example of FIG. 1, despite the example NN 170 that has 128 neurons and takes 128-byte feature vectors, the CI 100 may take as input an input feature vector 145 of length greater than 128 bytes (e.g., 500 bytes), and the NND 150 may implement a classification decision that utilizes greater than 128 neurons (e.g., 700 neurons).

In various embodiments, the NN 170 may utilize a context in order to specify a classification decision to be performed by the NN 170. In some embodiments, a context may include, for individual neurons, one or more of: a center feature vector, a context category, a type of norm, and an influence field. The context may also include a minimum and/or maximum influence field and/or network status registers. These, and other aspects of neural network contexts, may be understood to those of ordinary skill. The NND 150 may be configured to switch between contexts in order to perform decomposition of classification decisions utilizing the NN 170.

In various embodiments, the NND 150 may include an ordered set of contexts 160. For example, in various embodiments, the set of contexts 160, through its ordering, may provide an order for sub-decision spaces, such that sub-decision spaces whose performance is likely to increase the likelihood of a classification decision hit are used for classification before other sub-decision spaces that are less likely to provide a hit. Such ordering is described in additional detail below. In various embodiments, the CI 100 may also include a decomposition trainer 180 ("DT 180"), which may be configured to train the NND 150 to decompose classification decisions and provide classifications 190. In various embodiments, the DT 180 may be configured to order the contexts in the set of contexts 160 to facilitate later decomposition. In some embodiments, the DT 180 may not be located in the CI 100 or even in the computing device 105. Instead, the NND may be trained through action of a separate entity, such as before deployment of the computing device 105 to users. Various embodiments of training may be described below.

Figure 2:
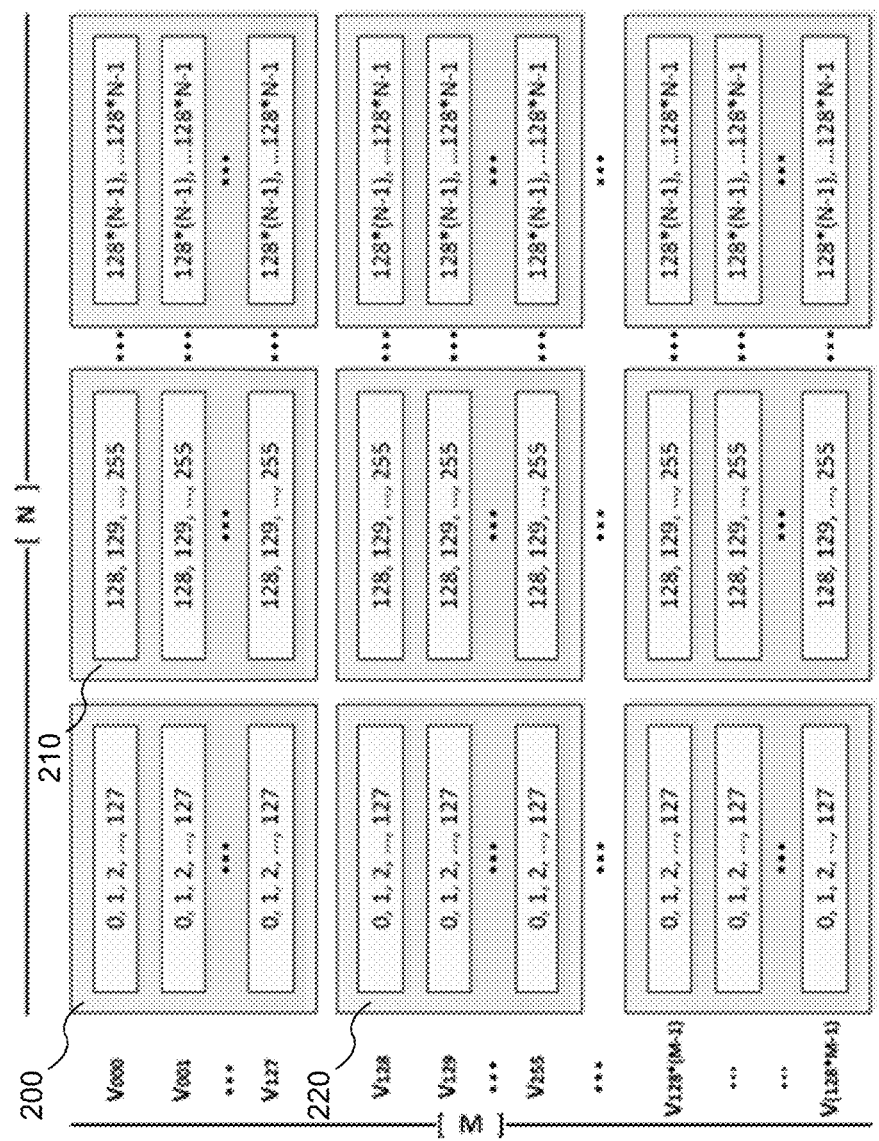
FIG. 2 illustrates an example of decomposition of a classification problem into sub-decision spaces, in accordance with various embodiments.

Referring now to FIG. 2, an example of decomposition of a classification problem into sub-decision spaces is illustrated in accordance with various embodiments. In the example, the NN 170 takes feature vectors of size 128 bytes and has 128 neurons. The NND 150, however, takes an input feature vector of a size greater than 128 bytes and performs classifications using more than 128 neurons. As illustrated, the decision space used by the NND 150 may thus be decomposed into 128-neuron-sized sub-decision spaces, such as sub-decision spaces 200, 210 and 220, that may be performed on the NN 170. In the example shown, each sub-decision space may take a feature vector of size 128 bytes (e.g., the feature vector size accepted by the NN 170). In various embodiments, these feature vectors may be obtained by dividing the input feature vector of into multiple 128-byte-size sub-feature vectors to be operated on the by NN 170. In the example, there are N sub-feature vectors. In various embodiments, the input feature vector may be divided sequentially, such that the input feature vector is divided into consecutive feature vectors of the size accepted by the NN 170. Thus, in the example of FIG. 2, given that NN 170 accepts feature vectors of size 128 bytes, the input feature vector 145 of size N is divided into bytes 0-127, 128-255, etc. It may be noted that, while the input feature vector 145 may have a length which is a multiple of the size of feature vectors accepted by the NN 170, in some embodiments, the input feature vector 145 may not be an integer multiple of that length. For example, the input feature vector 145 may have length 320 even if the NN 170 accepts feature vectors of size 128. In such cases, the input feature vector may be augmented with dummy data or edge values (such as 0) to allow for even division of the input feature vector 145.

Further, each sub-decision space may be associated with a sub-set of neurons out of the total number of neurons used by the NND 150; these sub-sets may be of the size of neurons implemented in the NN 170. In the example, there are M such sub-sets of neurons. Thus, in the example of FIG. 2, sub-decision space 200 may utilize the first 128 bytes out of the input feature vector and apply this to the first 128 neurons used by the NND 150, while sub-decision space 210 may apply the second 128 bytes of the input feature vector to those same neurons. Sub-decision space 220, by contrast, may apply the first 128 bytes of the input feature vector to the second sub-set of 128 neurons of the NND 150.

Figure 3:
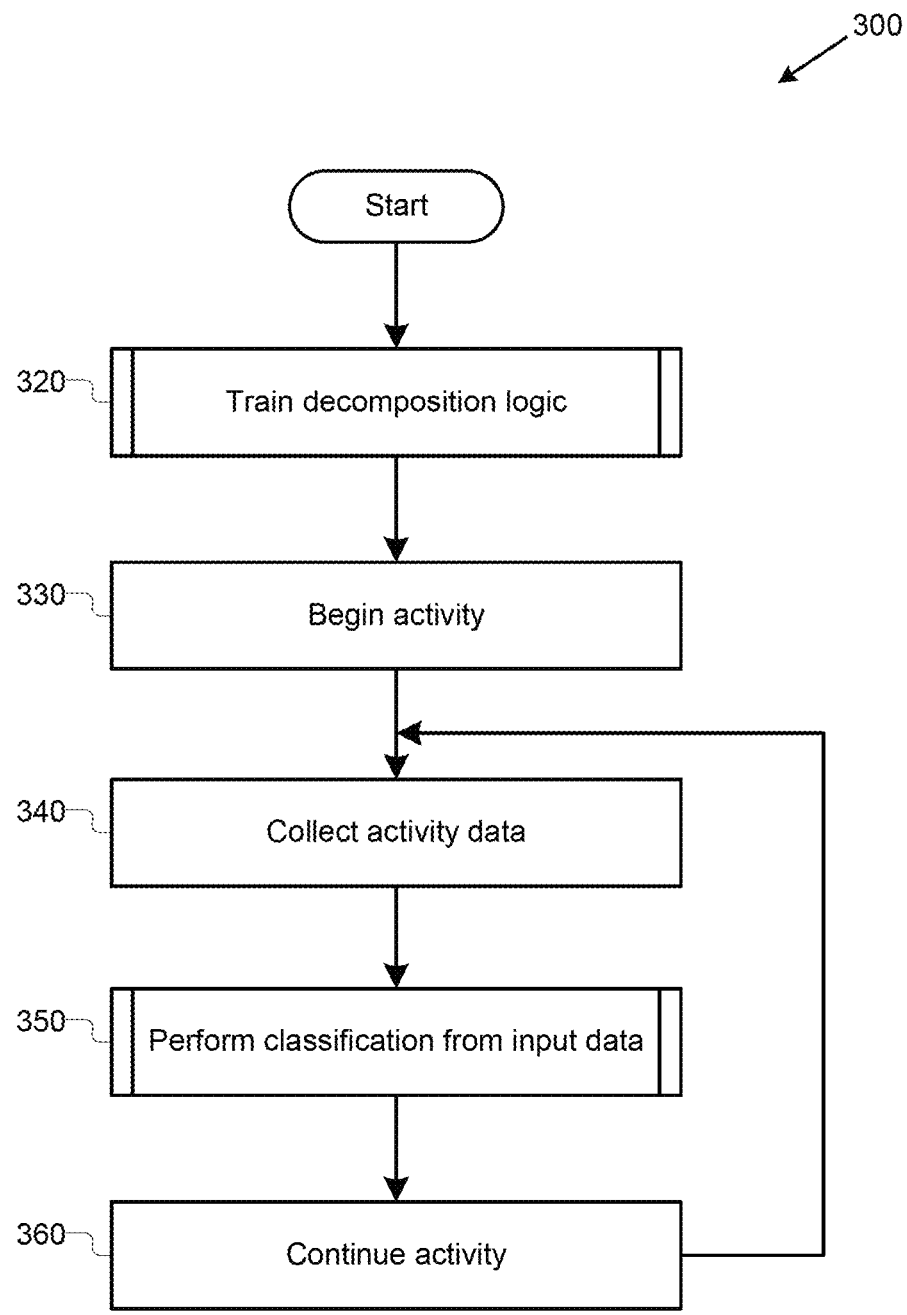
FIG. 3 illustrates an example process for classification using decomposition techniques as described herein, in accordance with various embodiments.

Referring now to FIG. 3, an example process 300 for classification using decomposition techniques as described herein is illustrated in accordance with various embodiments. While FIG. 3 illustrates particular operations in a particular order, in various embodiments the operations may be combined, split into parts, and/or omitted. In various embodiments, operations of process 300 (as well as sub-processes) may be performed by one or more of the CI 100, NND 150, NN 170, and/or DT 180. The process may begin at operation 320, where the DT 180 (or other training entity) may train the NND 150.

Particular embodiments of the process of operation 320 are described below with reference to process 400 of FIG. 4. Next, at operation 330, a user may begin activity for which the CI 100 is to perform classification decisions, and at operation 340, the CI 100 may collect activity data, such as device data 110, wearable data 120, and environmental data 130. In other embodiments, the classification techniques described herein may not be performed with relation to an activity, and thus data for classification may be obtained through other means. Next, at operation 350, the NND 150, utilizing the NN 170, may perform classification from the input activity (or other) data. Particular embodiments of the process of operation 350 are described below with reference to process 700 of FIG. 7. Next, at operation 360, the user may continue the activity, and the process may return to operation 340 to collect additional activity data. In other embodiments, such as when the CI 100 is utilized to perform classification decisions for data other than ongoing activity data, the process may then end.

Figure 4:
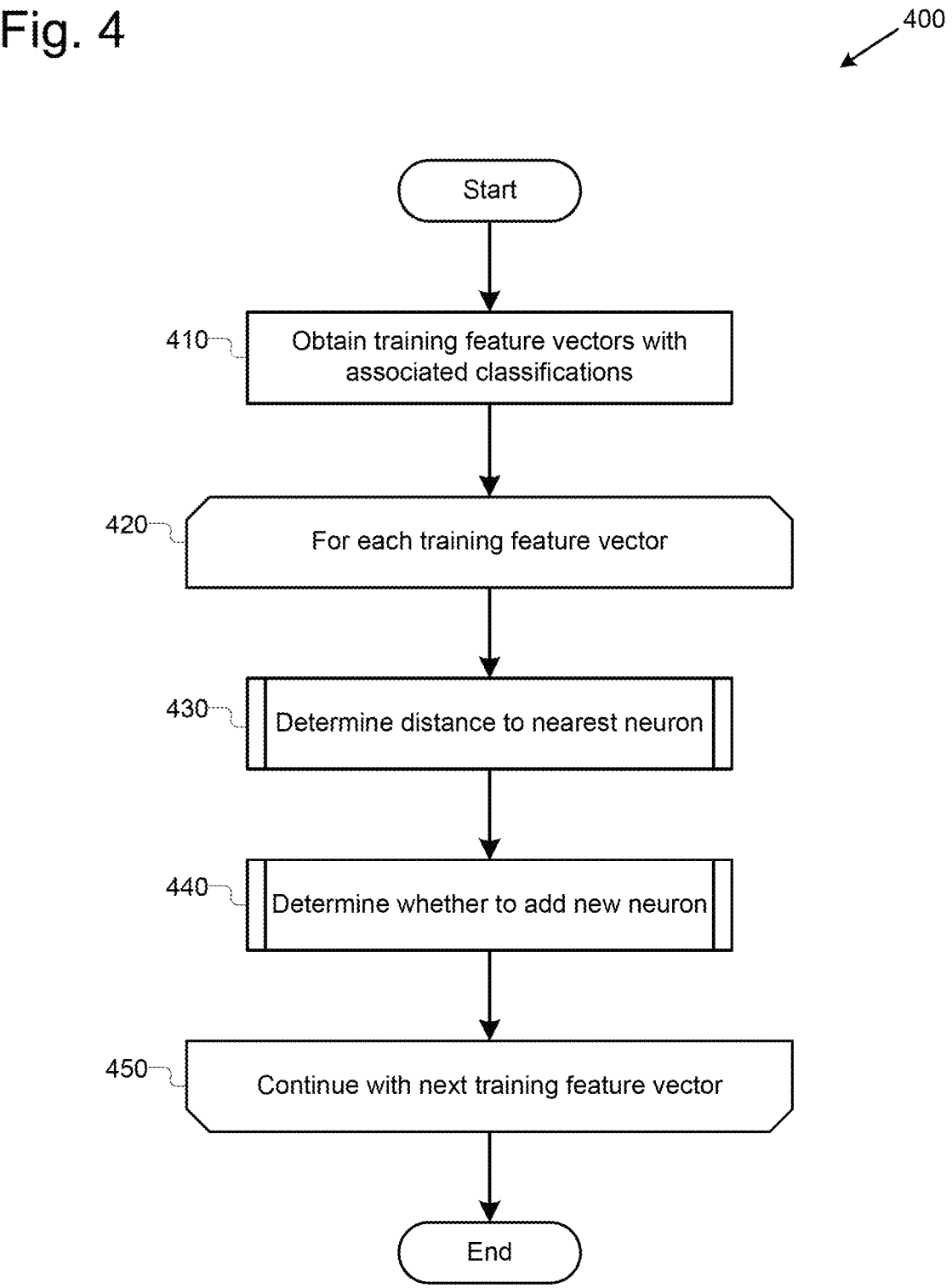
FIG. 4 illustrates an example process for training the classification system, in accordance with various embodiments.

Referring now to FIG. 4 an example process 400 for training the NND 150 is illustrated in accordance with various embodiments. In various embodiments, process 400 may be performed to implement, in whole or in part, operation 320 of process 300 of FIG. 3. While FIG. 4 illustrates particular operations in a particular order, in various embodiments the operations may be combined, split into parts, and/or omitted. In various embodiments, operations of process 400 (as well as sub-processes) may be performed by one or more of the DT 180, NND 150 and/or NN 170.

The process may begin at operation 410, where the DT 180 may obtain training input feature vectors and associated known classifications which may act as ground truth, as may be understood. In various embodiments, the DT 180 may use these training input feature vectors, which are known to be associated with particular ground truth classifications, as in order to train the NND 150 to correctly classify input feature vectors in the future. For example, if the NND 150 is being trained to recognize motion gestures performed by the user holding the device, the training input feature vectors may include feature vectors including data from known real-world gestures, along with ground truth classifications of which classifications those real-world gestures should be associated with.

Next, at loop operation 420, the DT 180 may enter a loop for each training input feature vector. In the loop, at operation 430, the NND 150 may determine a distance to a nearest neuron implemented by the NND 150, using the NN 170. Particular embodiments of the process of operation 430 are described below with reference to process 500 of FIG. 5. Next, at operation 440 the DT 180 may determine whether to add a new neuron to the NND 150. Particular embodiments of the process of operation 440 are described below with reference to process 600 of FIG. 6. Next, at loop operation 450, the DT 180 may continue training with the next training input feature vector, and may repeat the loop starting at loop operation 420. When the loop is complete, the NND 150 may contain sufficient neurons along with contexts to perform classification decisions for expected input data. The process may then end.

Figure 5:
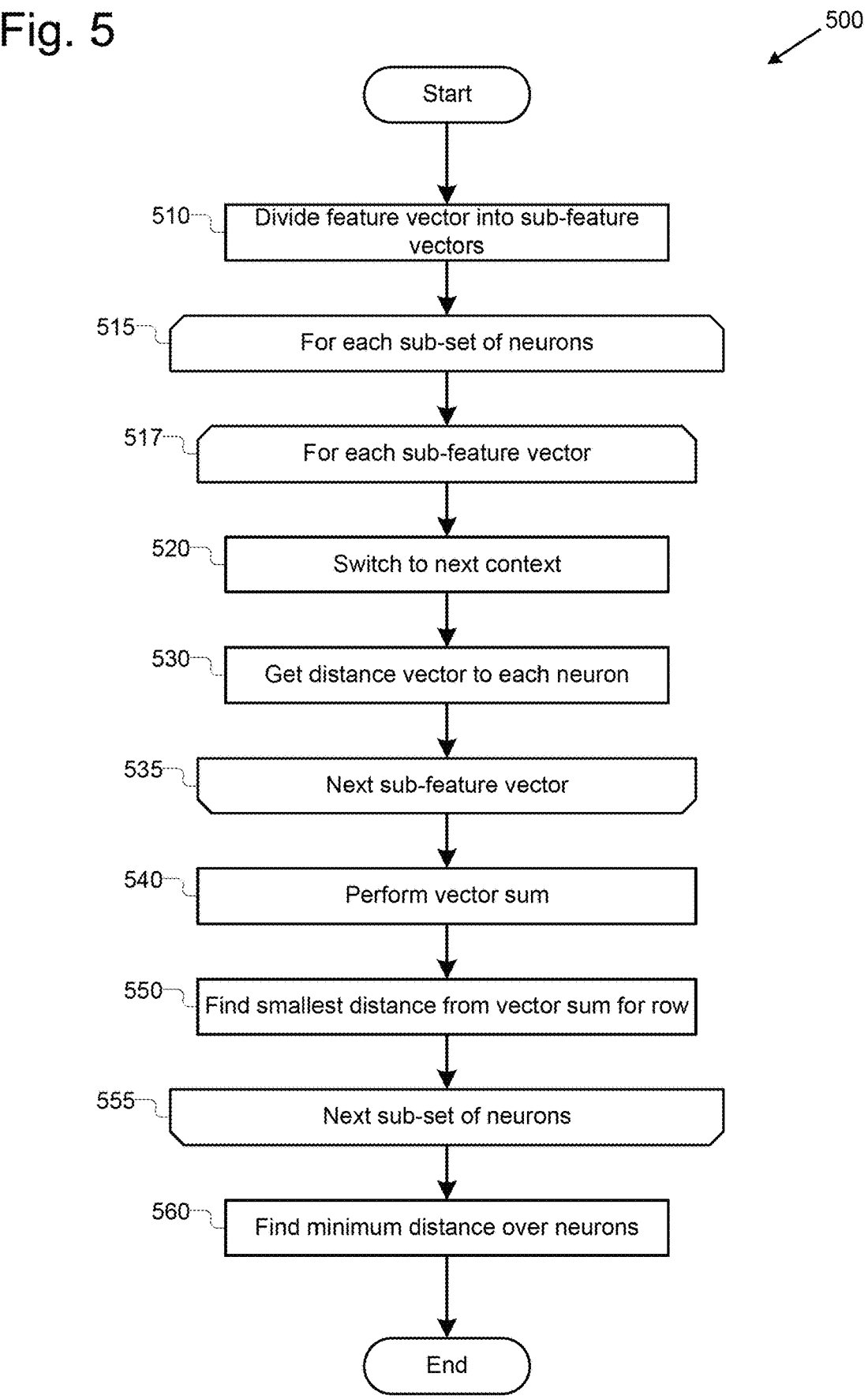
FIG. 5 illustrates an example process for determining a distance to a nearest neuron, in accordance with various embodiments.

Referring now to FIG. 5, an example process 500 for determining a distance to a nearest neuron is illustrated in accordance with various embodiments. In various embodiments, process 500 may be performed to implement, in whole or in part, operation 430 of process 400 of FIG. 4 (or of operation 720 of FIG. 7, described below). Thus, in various embodiments, process 500 may be utilized to determine a nearest neuron (and thus potentially a nearest classification) for an input feature vector, and may be utilized in both training of the NND 150 as well as classification later performed by a trained NND 150. While FIG. 5 illustrates particular operations in a particular order, in various embodiments the operations may be combined, split into parts, and/or omitted. In various embodiments, operations of process 500 (as well as sub-processes) may be performed by one or more of the NND 150 and/or NN 170. The process may begin at operation 510, where the input feature vector 145 may be divided into sub-feature vectors. As discussed above with respect to FIG. 2, at operation 510 the input feature vector may be divided into sub-feature vectors of a size equal to or less than the size of feature vectors accepted by the NN 170. In various embodiments, this division may be performed by partitioning the input feature vector 145 into consecutive sub-feature vectors. In other embodiments, other ways of dividing the input feature vector 145 may be utilized.

Next, at loop operation 515, the NND 150 may enter a first loop for each sub-set of the neurons of the NND 150. Then, at loop operation 517, the NND 150 may enter a second loop for each sub-feature vector. Next, inside the second loop, the NND 150 may switch to a new context, effectively selecting a new sub-decision space. At operation 520, the NND 150 may then load various values into the NN 170, such as, but not limited to: center feature vectors, context categories, types of norms, influence fields a minimum and/or maximum influence fields and/or network status registers. Next, at operation 530, the NN 170 may determine a distance to each neuron. This determination of distance may be performed using known neural network techniques. The second loop may then repeat for the next sub-feature vector at loop operation 535.

After the second loop has been completed for each of the sub-feature vectors, at operation 540 the NND 150 may perform a vector sum of the previously-determined distances to each neuron. Thus, for each sub-set of neurons, the vector sum will have a total distance over each of the sub-feature vectors to each neuron. Next, at operation 550, the NND 150 may determine the smallest distance out of that vector sum, e.g. the distance to the closest neuron for that sub-set of neurons. The first loop may then repeat at loop operation 555. Next, at operation 560, the NND 150 may determine a minimum distance out of the distances determined at the end of each iteration of the first loop. This will be minimum distance for any sub-set of neurons to its closest neuron. The process may then end.

In various embodiments, process 500 may be implemented through one or more implementations of the following pseudocode. In the following pseudocode, the value N may refer to the number of sub-feature vectors the input feature vector 145 may be divided into and the value M may refer to the number of sub-sets of neurons. Additionally, in this pseudocode, the NN 170 has 128 neurons and takes feature vectors of 128 byte length: TI. For a given new feature vector, divide the feature vector into N sub-feature vectors sequentially where each sub feature vector length is 128 bytes;

---

T1. For a given new feature vector, divide the feature vector into N sub-feature vectors sequentially where each sub feature vector length is 128 bytes;
T2. for (i = 0 to M − 1) {
    for (j = 0 to N − 1) {
        Switch to (i * N + j)th neuron network context;

$$\text{Get the distance vector } D_j = \begin{bmatrix} d_0 \\ d_1 \\ d_{...} \end{bmatrix} \text{ to each of the neurons in}$$

this context;
    }
    Perform vector sum for all distance vectors $D_j$ for that context and denote that vector sum as $\hat{D}$;
    Find the smallest distance from $\hat{D}$ as $l_i = \min(\hat{d}_0, \hat{d}_1, \ldots, \hat{d}_{127})$, where each $l_i$ represents the distance to the closest neuron for a the current sub-set of neurons;
}
T3. Get $L = \min(l_0, l_1, \ldots, l_{M-1})$ and its associated classification in the decision space;

---

Figure 6:
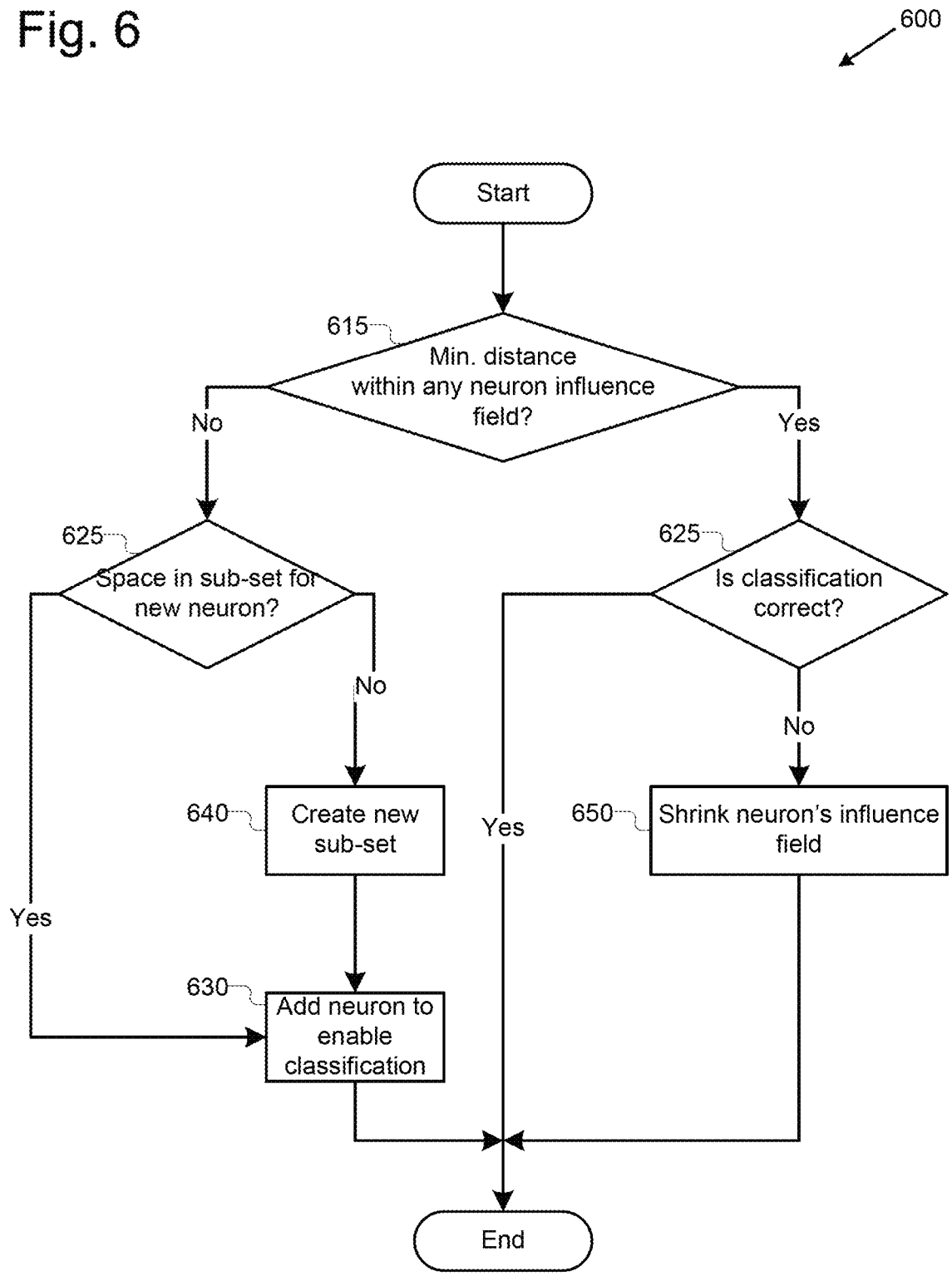
FIG. 6 illustrates an example process for determining whether to add a new neuron, in accordance with various embodiments.

Referring now to FIG. 6, an example process 600 for determining whether to add a new neuron is illustrated in accordance with various embodiments. In various embodiments, process 600 may be performed to implement, in whole or in part, operation 440 of process 400 of FIG. 4. While FIG. 6 illustrates particular operations in a particular order, in various embodiments the operations may be combined, split into parts, and/or omitted. In various embodiments, operations of process 600 (as well as sub-processes) may be performed by one or more of the DT 180, the NND 150 and/or the NN 170. The process may begin at decision operation 615, where the DT 180 may determine whether the previously computed distance from a neuron is within any neuron's influence field to identify a neuron for which the NND 150 is deciding from the input feature vector 145. If a neuron is so identified, then at decision operation 625, the DT 180 may compare the classification associated with the neuron to the classification ground truth associated with the input feature vector 145 by the DT 180 at operation 410. If the classifications are the same, then the classification decision was correctly performed and the process may then end. If the classifications are not the same, then the NND 150 incorrectly classified the input feature vector 145 and, thus, at operation 650, the DT 180 may shrink the identified neuron's influence field to avoid such a misidentification in the future, and the process may then end.

If, however, at decision operation 615 it is determined that the distance is not within any neuron's influence field, then at decision operation 625, a new neuron is needed by the NND 150. Thus, at decision operation 625 the DT 180 may determine whether there is space in a sub-set of neurons to accept a new neuron. If so, then at operation 630, a new neuron that appropriately classifies the input feature vector may be added, as may be understood by one of ordinary skill, and the process may then end. If there is no sub-set that has room, then at operation 640 a new sub-set may be created, and then at operation 630 the neuron may be added to that set, and the operation may then end.

Figure 7:
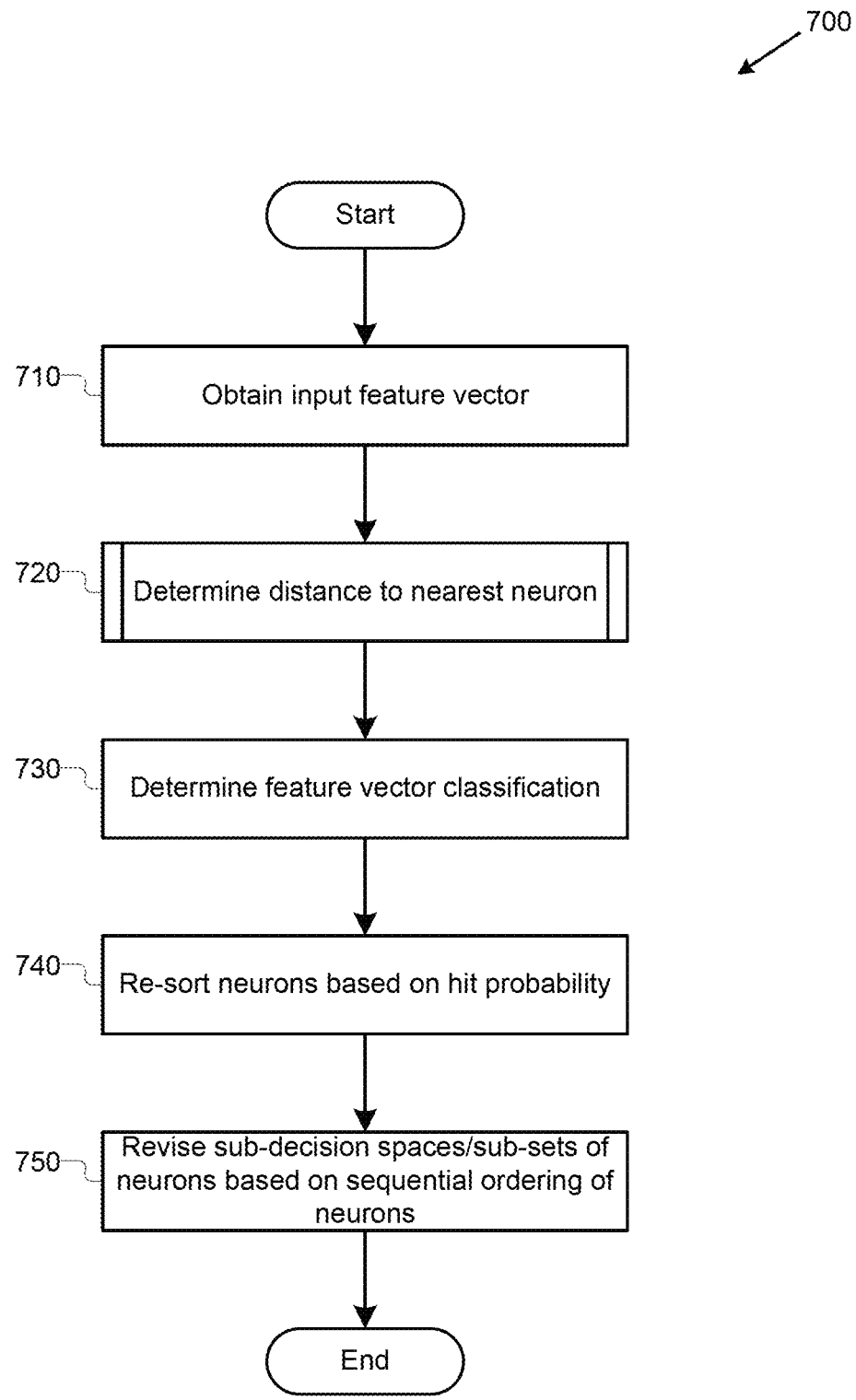
FIG. 7 illustrates an example process for recognizing a classification, in accordance with various embodiments.

Referring now to FIG. 7 an example process 700 for recognizing a classification is illustrated in accordance with various embodiments. In various embodiments, process 700 may be performed to implement, in whole or in part, operation 350 of process 300 of FIG. 3. While FIG. 7 illustrates particular operations in a particular order, in various embodiments the operations may be combined, split into parts, and/or omitted. In various embodiments, operations of process 700 (as well as sub-processes) may be performed by one or more of the NND 150 and/or NN 170. The process may begin at operation 710, where the CI may obtain an input feature vector 145 to classify. Next, at operation 720, the NND 150 may determine a distance to a nearest neuron. Particular embodiments of the process of operation 720 are described above with reference to process 500 of FIG. 5. Next, at operation 730, the NND 150 may decide a feature vector classification based on which neuron is closest from the process of operation 720. This classification may be output as classification 190 of FIG. 1.

After classification is completed, at operation 740 the NND 150 may re-sort neurons from the NND 150 based on their probability of obtaining a classification at operation 720. Next, at operation 750, the NND 150 may modify sub-sets of neurons based on the re-sorted list of neurons, such as by selecting neurons sequentially. Additionally, at operation 750, the sub-decision spaces may be modified to incorporate the new sub-sets of neurons. The process may then end. It may be noted, however, that while operations 740 and 750 are illustrated in FIG. 7 as happening immediately upon classification, in various embodiments, it may be desirous to delay sorting of the neurons and determination of sub-sets of neurons until later or to perform such re-sorting earlier. For example, once the training procedure is done, initial neuron sub-set re-sort may be performed using the training vectors based on their hit probability when classified to their associated categories. Such operations may occur later during times when greater computing resources are available, fewer classification requests are being received, etc. Such later re-sorts may be performed as a refinement to neuron sub-set re-sort optimization.

Figure 8:
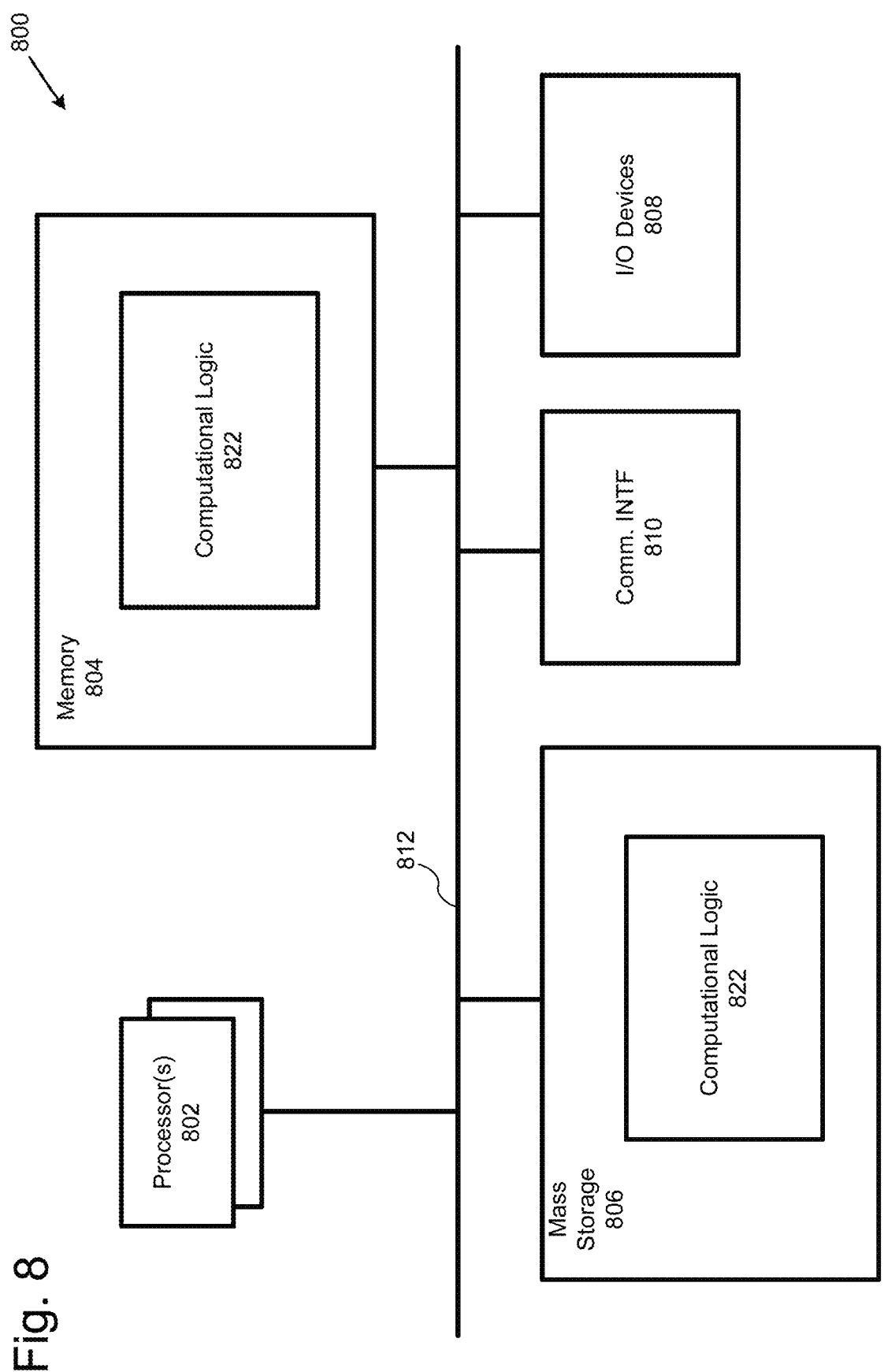
FIG. 8 illustrates an example computing environment suitable for practicing various aspects of the present disclosure in accordance with various embodiments.

Referring now to FIG. 8, an example computer suitable for practicing various aspects of the present disclosure, including processes of FIGS. 3-7, is illustrated in accordance with various embodiments. As shown, computer 800 may include one or more processors or processor cores 802, and system memory 804. For the purpose of this application, including the claims, the terms "processor" and "processor cores" may be considered synonymous, unless the context clearly requires otherwise. Additionally, computer 800 may include mass storage devices 806 (such as diskette, hard drive, compact disc read only memory (CD-ROM) and so forth), input/output devices 808 (such as display, keyboard, cursor control, remote control, gaming controller, image capture device, and so forth) and communication interfaces 810 (such as network interface cards, modems, infrared receivers, radio receivers (e.g., Bluetooth, Wi-Fi, Near Field Communications, Radio-frequency identification, and so forth). The elements may be coupled to each other via system bus 812, which may represent one or more buses. In the case of multiple buses, they may be bridged by one or more bus bridges (not shown).

Each of these elements may perform its conventional functions known in the art. In particular, system memory 804 and mass storage devices 806 may be employed to store a working copy and a permanent copy of the programming instructions implementing one or more of the modules shown in FIG. 1, and/or the operations associated with techniques shown in FIGS. 3-7, collectively referred to as computing logic 822. The various elements may be implemented by assembler instructions supported by processor(s) 802 or high-level languages, such as, for example, C, that can be compiled into such instructions. In various embodiments, the system memory 804 or mass storage 806 may include various memory implementations, including integrated flash memory, such as in a System on a Chip, a USB flash drive, SD Card, on SATA SSD, etc.

The permanent copy of the programming instructions may be placed into permanent storage devices 806 in the factory, or in the field, through, for example, a distribution medium (not shown), such as a compact disc (CD), or through communication interface 810 (from a distribution server (not shown)). In embodiments, the programming instructions may be stored in one or more computer readable non-transitory storage media. In other embodiments, the programming instructions may be encoded in transitory storage media, such as signals.

The number, capability and/or capacity of these elements 810-812 may vary. Their constitutions are otherwise known, and accordingly will not be further described.

Figure 9:
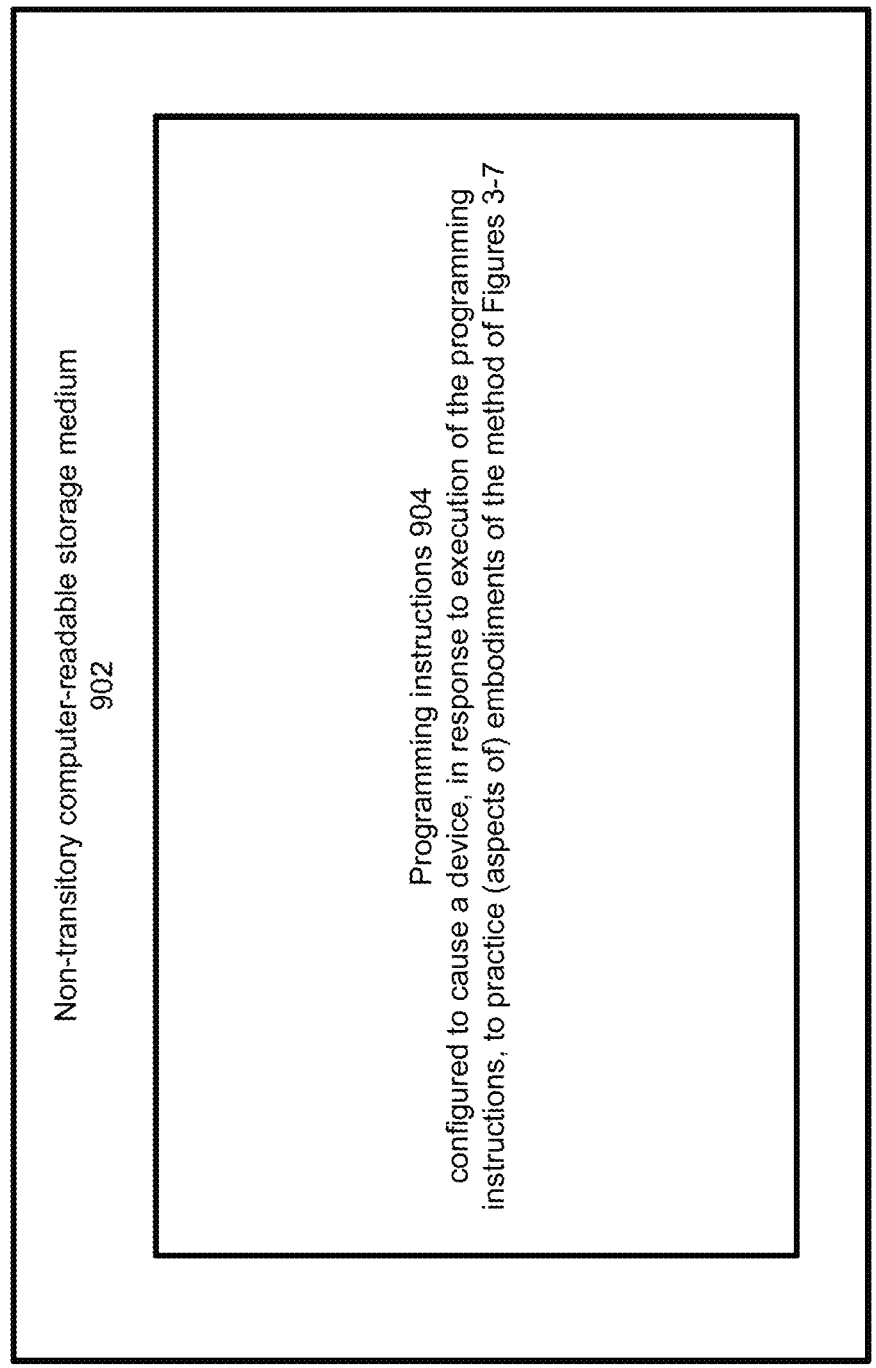
FIG. 9 illustrates an example storage medium with instructions configured to enable an apparatus to practice various aspects of the present disclosure in accordance with various embodiments.

FIG. 9 illustrates an example of at least one computer-readable storage medium 902 having instructions configured to practice all or selected ones of the operations associated with the techniques earlier described, in accordance with various embodiments. As illustrated, least one computer-readable storage medium 902 may include a number of programming instructions 904. Programming instructions 904 may be configured to enable a device, e.g., computer 800, in response to execution of the programming instructions, to perform, e.g., various operations of processes of FIGS. 3-7, e.g., but not limited to, to the various operations performed to perform decomposition and classification techniques described herein In alternate embodiments, program-ming instructions 904 may be disposed on multiple least one computer-readable storage media 902 instead.

Referring back to FIG. 8, for one embodiment, at least one of processors 802 may be packaged together with computational logic 822 configured to practice aspects of processes of FIGS. 3-7. For one embodiment, at least one of processors 802 may be packaged together with computational logic 822 configured to practice aspects of processes of FIGS. 3-7 to form a System in Package (SiP). For one embodiment, at least one of processors 802 may be integrated on the same die with computational logic 822 configured to practice aspects of processes of FIGS. 3-7. For one embodiment, at least one of processors 802 may be packaged together with computational logic 822 configured to practice aspects of processes of FIGS. 3-7 to form a System on Chip (SoC). For at least one embodiment, the SoC may be utilized in, e.g., but not limited to, a computing tablet. (e.g., Wi-Fi, Blue Tooth, Blue Tooth Low Energy, Near Field Communications, Radio-frequency identification (RFID), etc.) and other components as necessary to meet functional and non-functional requirements of the system.

Computer-readable media (including at least one computer-readable media), methods, apparatuses, systems and devices for performing the above-described techniques are illustrative examples of embodiments disclosed herein. Additionally, other devices in the above-described interactions may be configured to perform various disclosed techniques. Particular examples of embodiments, described herein include, but are not limited to, the following:

Example 1 may include an apparatus for decomposing classification decisions. The apparatus may include one or more computer processors and neural network logic coupled with or operated on the one or more computer processors to perform classifications of feature vectors. The neural network logic may be to operate on feature vectors of a first length using a first number of neurons. The apparatus may also include neural network decomposition logic to operate on the one or more computer processors to utilize the neural network logic to perform classification of input feature vectors of a second length through use of a second number of neurons, wherein the second number may be greater than the first number or the second length may be greater than the first length.

Example 2 may include the apparatus of example 1, wherein the neural network decomposition logic may be to perform classification of the input feature vectors through classification of input feature vectors on sub-decision spaces which operate on feature vectors of the first length using the first number of neurons.

Example 3 may include the apparatus of example 2, wherein the neural network decomposition logic may be further to maintain a plurality of contexts for the neural network logic.

Example 4 may include the apparatus of example 3, wherein the neural network decomposition logic may be further to switch between contexts during classification of input feature vectors on sub-decision spaces.

Example 5 may include the apparatus of example 3, wherein the neural network decomposition logic may be further to divide the input feature vector into sub-feature vectors and to divide the second number of neurons into neuron sub-sets.

Example 6 may include the apparatus of example 5, wherein the sub-feature vectors may be vectors of the first length.

Example 7 may include the apparatus of example 5, wherein the network decomposition logic may be to divide the second number of neurons into neuron sub-sets of the first size.

Example 8 may include the apparatus of example 7, wherein network decomposition logic may be to sort the neuron sub-sets based on hit probability during classification.

Example 9 may include the apparatus of any of examples 1-8, wherein the input feature vectors may include one or more of: device data, motion gesture data, or environmental data.

Example 10 may include the apparatus of any of examples 1-9, wherein the neural network logic may be implemented in hardware.

Example 11 may include the apparatus of any of examples 1-10, wherein the neural network logic may include a reference vector associated with each neuron.

Example 12 may include one or more computer-readable storage media containing instructions written thereon that, in response to execution on a computing system that may include neural network logic, cause the computing system to perform classification decisions for an input feature vector. The instructions may cause the computing system to perform classification on sub-decision spaces through use of the neural network logic, wherein the neural network logic may be to perform classification of feature vectors of a first length through use of a first number of neurons. The instructions may also cause the computing system to, based on classification on the sub-decision spaces, perform classification of the input feature vector, wherein the classification of the input feature vector may be through use of a second number of neurons that may be larger than the first number of neurons and the input feature vector has a second length larger than the first length.

Example 13 may include the computer-readable storage media of example 12, wherein perform classification on sub-decision spaces may include perform classification on sub-decision spaces which operate on feature vectors of the second length using the second number of neurons.

Example 14 may include the computer-readable storage media of example 13, wherein perform classification of the input feature vector may include maintain a plurality of contexts for the neural network logic.

Example 15 may include the computer-readable storage media of example 14, wherein perform classification of the input feature vector may further include switch between contexts during classification of input feature vectors on sub-decision spaces.

Example 16 may include the computer-readable storage media of example 14, wherein perform classification of the input feature vector may further include divide the input feature vector into sub-feature vectors and divide the second number of neurons into neuron sub-sets.

Example 17 may include the computer-readable storage media of example 16, wherein the sub-feature vectors may be vectors of the first length.

Example 18 may include the computer-readable storage media of example 16, wherein divide the second number of neurons into neuron sub-sets may include divide the second number of neurons into neuron sub-sets of the first size.

Example 19 may include the computer-readable storage media of example 18, wherein perform classification of the input feature vector may further include sort the neuron sub-sets based on hit probability during classification.

Example 20 may include the computer-readable storage media of any of examples 12-19, wherein the input feature vectors may include one or more of: device data, motion gesture data, or environmental data.

Example 21 may include the computer-readable storage media of any of examples 12-20, wherein the neural network logic may be implemented in hardware.

Example 22 may include the computer-readable storage media of any of examples 12-19 wherein the neural network logic may include a reference vector associated with each neuron.

Example 23 may include a computer-implemented method for performing classification decisions for an input feature vector. The method may include performing, by a computing system that may include neural network logic, classification on sub-decision spaces through use of the neural network logic, wherein the neural network logic may be to perform classification of feature vectors of a first length through use of a first number of neurons. The method may also include, based on classification on the sub-decision spaces, performing, by the computing system, classification of the input feature vector, wherein the classification of the input feature vector may be through use of a second number of neurons that may be larger than the first number of neurons and the input feature vector has a second length larger than the first length.

Example 24 may include the method of example 23, wherein performing classification on sub-decision spaces may include performing classification on sub-decision spaces which operate on feature vectors of the second length using the second number of neurons.

Example 25 may include the method of example 24, wherein performing classification of the input feature vector may include maintaining a plurality of contexts for the neural network logic.

Example 26 may include the method of example 25, wherein performing classification of the input feature vector may further include switching between contexts during classification of input feature vectors on sub-decision spaces.

Example 27 may include the method of example 25, wherein performing classification of the input feature vector may further include dividing the input feature vector into sub-feature vectors and dividing the second number of neurons into neuron sub-sets.

Example 28 may include the method of example 27, wherein the sub-feature vectors may be vectors of the first length.

Example 29 may include the method of example 27, wherein dividing the second number of neurons into neuron sub-sets may include dividing the second number of neurons into neuron sub-sets of the first size.

Example 30 may include the method of example 29, wherein performing classification of the input feature vector may further include sorting the neuron sub-sets based on hit probability during classification.

Example 31 may include the method of any of examples 23-30, wherein the input feature vectors may include one or more of: device data, motion gesture data, or environmental data.

Example 32 may include the method of any of examples 23-31, wherein the neural network logic may be implemented in hardware.

Example 33 may include the method of any of examples 23-30 wherein the neural network logic may include a reference vector associated with each neuron.

Example 34 may include an apparatus for performing classification decisions for an input feature vector. The apparatus may include: neural network logic to operate on feature vectors of a first length using a first number of neurons, means for performing classification on sub-decision spaces through use of the neural network logic, and means for performing classification of the input feature vector, wherein the classification of the input feature vector is through use of a second number of neurons that may be larger than the first number of neurons and the input feature vector has a second length larger than the first length.

Example 35 may include the apparatus of example 34, wherein means for performing classification on sub-decision spaces may include means for performing classification on sub-decision spaces which operate on feature vectors of the second length using the second number of neurons.

Example 36 may include the apparatus of example 35, wherein means for performing classification of the input feature vector may include means for maintaining a plurality of contexts for the neural network logic.

Example 37 may include the apparatus of example 36, wherein means for performing classification of the input feature vector may further include means for switching between contexts during classification of input feature vectors on sub-decision spaces.

Example 38 may include the apparatus of example 36, wherein means for performing classification of the input feature vector may further include means for dividing the input feature vector into sub-feature vectors and means for dividing the second number of neurons into neuron sub-sets.

Example 39 may include the apparatus of example 38, wherein the sub-feature vectors may be vectors of the first length.

Example 40 may include the apparatus of example 38, wherein means for dividing the second number of neurons into neuron sub-sets may include means for dividing the second number of neurons into neuron sub-sets of the first size.

Example 41 may include the apparatus of example 40, wherein means for performing classification of the input feature vector may further include means for sorting the neuron sub-sets based on hit probability during classification.

Example 42 may include the apparatus of any of examples 34-41, wherein the input feature vectors may include one or more of: device data, motion gesture data, or environmental data.

Example 43 may include the apparatus of any of examples 34-42, wherein the neural network logic may be implemented in hardware.

Example 44 may include the apparatus of any of examples 34-43 wherein the neural network logic may include a reference vector associated with each neuron.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for decomposing classification decisions, the apparatus comprising:
   one or more computer processors;
   neural network logic coupled with or operated on the one or more computer processors to perform classification of a first feature vector having a first length, using a first number of neurons; and
   neural network decomposition logic to operate on the one or more computer processors to perform classification of a second feature vector of a second length using a second number of neurons, the second number being greater than the first number or the second length being greater than the first length;
   wherein the neural network decomposition logic is to perform the classification of the second feature vector of the second length using the second number of neurons through a plurality of usages of the neural network logic on a corresponding plurality of sub-decision spaces, where each of the sub-decision spaces comprises a segment of the second feature vector, or a subset of the second number of neurons, with the particular segment of the second feature vector and the particular subset of the second number of neurons being the first feature vector and the first number of neurons of the particular use of the neural network logic.

2. The apparatus of claim 1, wherein each segment of the second feature vector of each sub-decision space has a segment length not exceeding the first length, and each subset of the second number of neurons of each sub-decision space has a subset size not exceeding the first number.

3. The apparatus of claim 2, wherein the neural network decomposition logic is further to maintain a plurality of contexts for the neural network logic.

4. The apparatus of claim 3, wherein the neural network decomposition logic is further to switch between contexts during classification of the segments of the second feature vector of the sub-decision spaces.

5. The apparatus of claim 3, wherein the neural network decomposition logic is further to divide the second feature vector into the segments and to divide the second number of neurons into the subsets.

6. The apparatus of claim 1, wherein network decomposition logic is to further sort the subsets of neurons based on respective hit probabilities as indicated by the plurality of usages of the neural network logic.

7. The apparatus of claim 1, wherein the second feature vector includes one or more of: device data, motion gesture data, or environmental data.

8. The apparatus of claim 1, wherein the neural network logic is implemented in hardware.

9. The apparatus of claim 1, wherein the neural network logic includes a reference vector associated with each neuron.

10. A computer-implemented method for performing a classification of an input feature vector having a second length and using a second number of neurons, the method comprising:
    performing, by a computing system that includes neural network logic, classifications on a plurality of sub-decision spaces of a decision space of the classification, through repeated respective use of the neural network logic on the plurality of sub-decision spaces, each sub-decision space comprises a segment of the input feature vector and a subset of the second number of neurons, wherein the neural network logic is arranged to perform classification of a first feature vector having a first length through use of a first number of neurons, the first length being smaller than the second length, or the first number being smaller than the second number, and wherein a particular segment of the input feature vector and a particular subset of the second number of neurons of a particular sub-decision space are provided as the first feature vector and the first number of neurons of the neural network logic of a particular use for the particular sub-decision space; and based on classifications of the sub-decision spaces, performing, by the computing system, classification of the input feature vector.

11. The method of claim 10, wherein each segment of the second feature vector of each sub-decision space has a segment length not exceeding the first length and each subset of the second number of neurons of each sub-decision space has a subset size not exceeding the first number.

12. The method of claim 11, wherein performing classification of the input feature vector comprises maintaining a plurality of contexts for the neural network logic.

13. The method of claim 12, wherein performing classification of the input feature vector further comprises switching between contexts during classifications of the segments of the input feature vectors of the sub-decision spaces.

14. The method of claim 12, wherein performing classification of the input feature vector further comprises dividing the input feature vector into segments and dividing the second number of neurons into the subsets.

15. The method of claim 10, wherein performing classification of the input feature vector further comprises sorting the subsets of neuron based on respective hit probabilities as indicated by a plurality of usages of the neural network logic.

16. The method of claim 10, wherein the neural network logic is implemented in hardware.

17. One or more computer-readable storage media containing instructions written thereon that, in response to execution on a computing system, cause the computing system to perform a classification of an input feature vector having a second length and using a second number of neurons, wherein the perform the classification includes to:

perform classification on a plurality of sub-decision spaces through respective use of a neural network logic, each sub-decision space comprises a segment of the input feature vector and a subset of the second number of neurons, wherein the neural network logic is to perform classification of a first feature of a first length through use of a first number of neurons, the first length being smaller than the second length, or the first number being smaller than the second number, and wherein a particular segment of the input feature vector and a particular subset of the second number of neurons of a particular sub-decision space are provided as the first feature vector and the first number of neurons of the neural network logic of a particular use for the particular sub-decision space; and on classifications of the sub-decision spaces, perform classification of the input feature vector.

18. The computer-readable storage media of claim 17, wherein each segment of the input feature vector of each sub-decision space has a segment length not exceeding the first length and each subset of the second number of neurons of each sub-decision space has a subset size not exceeding the first number.

19. The computer-readable storage media of claim 18, wherein perform classification of the input feature vector comprises maintain a plurality of contexts for the neural network logic.

20. The computer-readable storage media of claim 19, wherein perform classification of the input feature vector further comprises switch between contexts during classifications of the segments of the input feature vectors of the sub-decision spaces.

21. The computer-readable storage media of claim 19, wherein perform classification of the input feature vector further comprises divide the input feature vector into the segments and divide the second number of neurons into subsets.

* * * * *